United States Patent

Bruist

[11] 3,863,718
[45] Feb. 4, 1975

[54] CEMENTING PROCEDURE FOR AVOIDING MUD CHANNELING

[75] Inventor: Edmond H. Bruist, New Orleans, La.

[73] Assignee: Shell Oil Company, Houston, Tex.

[22] Filed: Mar. 27, 1974

[21] Appl. No.: 455,171

[52] U.S. Cl. .............................. 166/285, 166/291
[51] Int. Cl. ...................... E21b 33/14, E21b 33/16
[58] Field of Search ............ 166/291, 292, 285, 315

[56] References Cited
UNITED STATES PATENTS

| | | | |
|---|---|---|---|
| 2,582,909 | 1/1952 | Laurence | 166/291 |
| 2,675,082 | 4/1954 | Hall | 166/285 |
| 3,022,823 | 2/1962 | Caldwell et al. | 166/291 |
| 3,291,211 | 12/1966 | Savins et al. | 166/285 |
| 3,688,845 | 9/1972 | Messenger | 166/291 |
| 3,749,173 | 7/1973 | Hill et al. | 166/291 |
| 3,799,874 | 3/1974 | Parker | 166/291 X |

Primary Examiner—Stephen J. Novosad

[57] ABSTRACT

When cementing a pipe section (such as a production casing or liner) in a well, problems due to mud channeling are avoided by displacing the drilling fluid (before running-in the pipe section) and replacing the drilling fluid with a subsequently solidifiable liquid that remains pumpable while the pipe section is being installed and the cement slurry is being injected, and then solidifies, during or after, the solidifying of the cement.

9 Claims, 3 Drawing Figures

3,863,718

PATENTED FEB 4 1975

CEMENTING PROCEDURE FOR AVOIDING MUD CHANNELING

BACKGROUND OF THE INVENTION

The invention relates to an improved process for cementing a pipe section in a well (e.g., positioning a casing or liner in the borehole, injecting a slurry of cement into the annular space around such a pipe section and allowing the cement to solidify).

Procedures for cementing casings or other pipe sections in wells have been used for years. Numerous proposals have been made for avoiding the problems referred to as "mud channeling problems". For example, as disclosed in U.S. Pat. No. 2,582,909, filed in 1947, it is known that materials such as the dissolved calcium in a cement slurry tend to react with and gel or solidify any contacted portions of an aqueous drilling fluid that contains clay that was either added to increase the viscosity of the fluid and/or was entrained during the drilling operation. While a slurry of cement is being flowed into the annular space around a casing in a well, the precipitated, gelled, or otherwise immobilized portions of the drilling fluid tend to be by-passed by the slurry. The by-passed portions then become lumps or stringers amounting to "mud channels" within the sheath of solidified cement that surrounds the casing.

When a cemented-in portion of casing has been perforated in order to establish fluid communication with a selected reservoir zone, fluids injected into or produced from the reservoir tend to move through or around any by-passed drilling fluid materials in the mud channels. Such flows destroy the zonal isolation the cement is intended to provide and may result in a need for an expensive remedial cement squeezing operation and/or cause a loss of the well.

As indicated by U.S. Pat. No. 2,848,051; in 1954, the continued existence of mud channeling problems led to a proposal that the cement slurry being injected into the annular space around the casing be preceded by a slug of an inert slurry that has improved properties relative to those of a slurry of cement with respect to not causing the gelling of a drilling fluid and/or with respect to displacing a gelled drilling fluid in order to provide a better mud displacement. However, as indicated by U.S. Pat. No. 3,749,173; in 1972, the continued existence of mud channeling problems led to a proposal that such a spacer fluid for displacing the drilling fluid from the annular space around the casing be an organic liquid that is gelled with a metal salt of an aliphatic substituted orthophosphate ester.

SUMMARY OF THE INVENTION

In accordance with the present invention, a relatively slender pipe string having an outer diameter significantly less than the borehole diameter is extended to near the bottom of a drilling-fluid-containing portion of a well borehole into which a pipe section is to be installed. Fluid is flowed through the pipe string to displace substantially all of the drilling fluid out of that portion of the borehole. Substantially the only fluid which is left in that portion of the borehole is a subsequently solidifiable fluid that (a) has a density at least substantially equalling that of the drilling fluid which was displaced, (b) has a chemical composition adapting it to remain pumpable while remaining at the borehole temperature until the pipe section has been installed and a cement slurry has been inflowed, and (c) subsequently solidifies to form a substantially impermeable solid.

DESCRIPTION OF THE INVENTION

Figure 1:
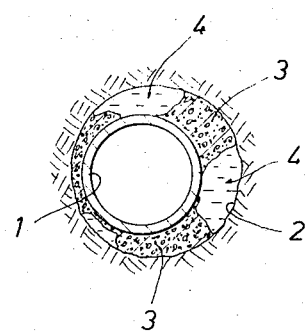
FIG. 1 is a schematic cross section of a borehole in which a casing has been cemented by the procedures of the prior art.

FIG. 1 shows a casing 1 that was cemented in a borehole 2 by a prior art cementing procedure. Typically, such a procedure results in a sheath of solidified cement 3, that is permeated by channels of by-passed drilling fluid 4. Such mud channels are apt to be formed during substantially any attempt to displace a drilling fluid out of the annular space around a pipe section such as a casing with or without the use of a mud displacing fluid between the cement and the drilling fluid. Several factors are involved.

A time interval exceeding one to three days is usually required for removing a drilling string from the well and installing a casing or liner in the portion of the borehole in which it is to be cemented. A drilling fluid is designed to maintain selected specific gravity and viscosity properties while it is being circulated into and out of a borehole. When a drilling fluid is kept static at the relatively high temperature near the bottom of the borehole, e.g. is not circulated while the drill string is removed and a casing is inserted, it tends to become exceedingly viscous.

The annular space between a casing or liner and a borehole wall is generally relatively small. For example, the spaces around a 7-inch casing in a 9⅞ inch borehole, or a 9⅝ inch casing in a 12¼ inch borehole provide average clearances of less than 1½ inch. The boreholes are seldom perfectly straight and vertical. Where the boreholes are curved, the casings are forced closer to one side of the borehole, even where casing-centralizers are used. In general, the annular space around a pipe section being cemented is a tortuous meandering space that contains numerous restrictions. This almost ensures that an inflowing cement slurry will bypass the drilling fluid to leave mud channels in the solified cement. Where one portion of the path is restricted, most or all of the inflowing slurry is diverted into another portion.

Field experience has indicated that the main problem in obtaining satisfactory primary cementation is still caused by the incomplete displacement of the drilling fluid by the cement slurry. The resulting mud channeling may occupy a large percentage of the annular volume between the casing and the formation. The severity of the channeling depends upon the condition of the borehole and the cementing techniques that are applied. In order to minimize the mud channeling problem, numerous relatively expensive and/or difficult and time-consuming cementing techniques are commonly employed. Such techniques seek to ensure that the casing and/or liner by (1) properly centralized (2) equipped with scratchers (3) reciprocated or rotated during the cementing; in addition, (4) the borehole should be free of washed-out zones, (5) the cement slurry should be pumped in with either relatively high or relatively low pumping rates in order to induce either a turbulent flow or a plug flow, (6) the cement slurry and drilling fluid should be separated by a suitable and sufficient spacer fluid, and (7) the properties such as viscosity, weight, and water-loss, of the cement slurry and those of the drilling fluid should be compatible and be carefully controlled. Even when all of these conditions are stringently adhered to, there is no assurance that a satisfactory primary cementation will be obtained. In practice, the borehole situation is often far less favorable than desired, and many of the specified conditions are not, and often cannot, be met.

The present invention is, at least in part, based on a discovery that the mud channeling problems can advantageously be avoided by utilizing a particular sequence of steps that leave the borehole filled with a subsequently solidifiable fluid at the time the casing is inserted into the borehole. The drilling fluid is displaced before, rather than after, the pipe section to be cemented is placed within the boreholes. It is particularly desirable that the borehole section from which the drilling fluid is displaced extend at least substantially through the objective zone of the subterranean reservoir into which the well is to be completed. This ensures that substantially all of the fluid left in the treated portion of the borehole is adapted to remain pumpable for a time, preferably about two days or more, sufficient to ensure that it remains pumpable throughout the removal of the drill pipe, or work string, the installation of the pipe section to be cemented, and the injection of the cement slurry. The displacing of the drilling fluid before the installing of the pipe section to be cemented also provides a convenient opportunity for removing substantially all of the filter cake (deposited by the drilling fluid) from the borehole wall. As a result of the drilling fluid replacement, the cement slurry can be pumped into the annular space around the pipe section to be cemented, and there solidified, with a minimum of time and trouble and with an assurance that the sheath formed by the solidifying of both the cement and any bypassed portions of the subsequently solidifiable fluid will be fluid-tight.

The subsequently solidifiable fluid used in the present invention can comprise substantially any pumpable fluid (solution and/or slurry) that (a) has a density at least substantially equalling that of the drilling fluid that is displaced from the borehole, and (b) has a chemical composition adapting it to remain pumpable until a pipe section has been installed and a cement slurry inflowed and then form a substantially solid material that is, effectively, impermeable and immobile. Such a fluid can contain relatively slowly reactive components that complete a fluidsolidifying reaction in response to an appropriate time-temperature exposure. Alternatively, or additionally, it can contain potentially reactive components that initiate a relatively slow fluid-solidifying reaction when they are contacted with materials that diffuse into them while they are maintained in contact with a cement slurry. Examples of suitable subsequently solidifiable fluids include: aqueous liquids that are thickened with dispersed clays and contain lime and a caustic in proportions such that they are relatively slowly time-solidifying fluids with respect to temperatures above about 200°F; aqueous liquid suspensions containing inert particles mixed with particles of materials, such as raw cement or pozzolan or the like, that tend to be relatively slowly solidified when they are kept in contact with a cement slurry, such as the raw cement or pozzolancontaining slurries described in U.S. Pat. No. 2,848,051; a time solidifying metal hydroxide-gelled fluid containing enough ungelled metal salt and pH-altering reactant to become subsequently solidified as the pH is changed, such as those described in the co-pending patent application by J. A. Herce and R. N. Tuttle, Ser. No. 424,397, filed Dec. 13, 1973 (the disclosures of which are incorporated herein by cross-reference); and the like composition. Particularly suitable subsequently solidifiable fluids include aqueous liquid solutions of water-soluble amphoteric metals, water soluble bases, and water soluble pH-altering reactants, in which solutions are suspended fine solids in proportions such that the solution initially has a suitable viscosity and density and, with time at the temperature of the zone in which a pipe section is to be cemented, becomes a substantially impermeable and substantially solid material. For example, such a suspension comprises water containing enough dissolved aluminum salt to provide about 2 moles per liter of aluminum ions, enough dissolved base to provide a solution equivalent to about a 4 molar sodium hydroxide solution, and an amount of carboxylic acid amide equivalent to form about 1–2 moles per liter of ammonia (with the amide composition being correlated with the borehole temperature so that the faster reacting materials, such as formamide or acetamide, are used for lower temperatures than are the slower reacting materials, such as urea) and from about 20 to 40 percent by weight of the aqueous liquid of a finely-divided substantially inert solid material, such as silica flour.

Figure 2:
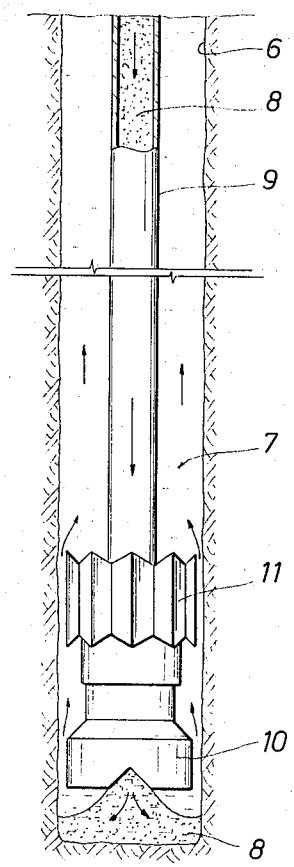
FIGS. 2 and 3 are schematic illustrations of portions of boreholes and materials in them during different stages of practicing the present invention.

FIG. 2 shows an initial stage of a casing cement operation utilizing the present invention. Borehole 6 contains a drilling fluid 7 within a portion of the borehole in which a casing is to be installed. As indicated by the arrows, a subsequently solidifiable fluid 8 is being flowed through a pipe string 9 (such as a drill string or a work string) that is equipped with a drill bit 10, and a filter cake removing device 11 and is extended to near the bottom of that portion of the borehole.

Where desirable, a slug of an inert mid-displacing spacer, such as those described in U.S. Pat. Nos. 2,848,051 or 3,749,173, or the like (not shown), can be injected ahead of the subsequently solidifiable fluid. The density of the one or more fluids that are inflowed through such a pipe string to displace and/or replace the drilling fluid should be substantially equal to that of the displaced drilling fluid, in order to avoid a tendency for gravity segregation within the borehole, and to maintain a hydrostatic pressure substantially equalling that provided by the drilling fluid.

The fluid-inflowing pipe string 9 preferably has an outer diameter that is significantly less than the inner diameter of the borehole, such as a drilling string having an outer diameter of about 4 inches in a borehole having a diameter of at least about 9 inches. The annular space around such a pipe string is, in effect, a large diameter conduit that offers substantially no restriction to fluid flowing at the flow rates that are feasible and desirable relative to displacing a drilling fluid from a borehole. Such a pipe string is preferably equipped with at least one filter-cake removing device, such as a drill bit, and/or properly space reamers, fluid jets, a flow restricting enlargement of the pipe string outer diameter, or the like, for mechanically and/or hydraulically stripping off any filter cake (or mud cake) that was formed along the wall of the borehole. A substantially complete displacement of the drilling fluid can readily be effected by mechanically manipulating the pipe string assembly to enhance the filter-cake-stripping action and/or to ensure the completeness of the displacement of the drilling fluid. Such a mechanical manipulation can advantageously include the rotating of the pipe string assembly and/or the making of one or more short trips through the portion of the borehole in which mud channels in the cement sheath must be avoided, i.e. the objective reservoir zone.

Figure 3:
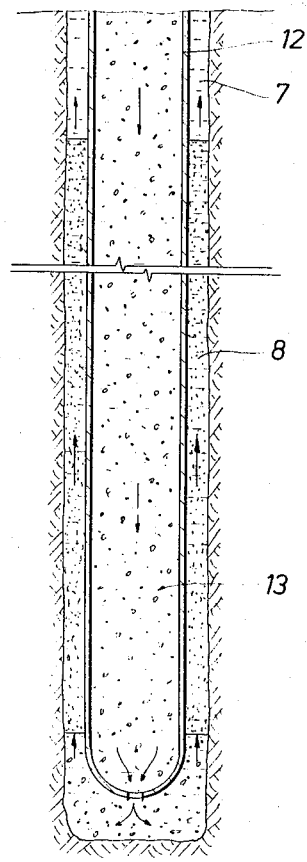

FIG. 3 shows a later stage of a casing cementing operation of the present type. A string of casing 12 is positioned within a portion of the borehole that contains the subsequently solidifiable fluid 8. A cement slurry 13 is flowed through the casing and into the annulus around the casing, as shown by the arrows. Since the fluid in the annulus is a subsequently solidifiable fluid, no mud channels will be formed in the resulting sheath of solidified cement due to any portions that are bypassed by the inflowing cement slurry. The bypassed portions will solidify and ensure the fluid-tight integrity of all portions of the cement sheath.

In certain situations the present process can be simplified, particularly where the portion of the borehole into which a pipe section is to be cemented is relatively shallow and/or is unlikely to be subjected to high stress. The subsequently solidifiable fluid composition is selected and/or adjusted so that, at the temperature of the zone in which the pipe section is to be installed, the fluid remains pumpable for at least about a day and then solidifies (in the absence of any contact with a cement slurry) within not more than about 10 days and becomes substantially solid and impermeable. The drilling fluid is displaced by inflowing that subsequently solidifiable fluid through a relatively slender pipe string. The latter is replaced by the pipe section to be installed. And, the subsequently solidifiable fluid is allowed to solidify to provide the sealing and stabilizing bond between the pipe section and the borehole wall.

What is claimed is:

1. A process for installing a pipe section that is to be cemented within a drilling-fluid-containing portion of a borehole of a well, which process comprises;
   extending a relatively slender pipe string having an outer diameter significantly less than the borehole diameter into the borehole until it extends to at least near the bottom of the portion of the borehole in which the pipe section is to be cemented;
   flowing fluid through the relatively slender pipe string to displace substantially all of the drilling fluid out of that portion of the borehole;
   filling that portion of the borehole substantially completely with a subsequently solidifiable fluid that has a density at least substantially equalling that of the displaced drilling fluid and has a chemical composition that adapts it to remain pumpable, while remaining at the borehole temperature until the pipe section has been installed and a cement slurry has been inflowed, and then become substantially solid and impermeable;
   removing the relatively slender pipe string and installing the pipe section to be cemented, and
   flowing a cement slurry into the annular space around the pipe section and allowing the solidification of both the cement and any subsequently solidifiable fluid that is present in that annular space.

2. The process of claim 1 in which the relatively slender pipe string is mechanically manipulated to enhance the removing of a filter cake from the borehole wall and the displacing of the drilling fluid.

3. The process of claim 2 in which the relatively slender pipe string is equipped with a mechanical device for removing a filter cake.

4. The process of claim 1 in which the drilling fluid is displaced by flowing the subsequently solidifiable fluid into contact with the drilling fluid.

5. The process of claim 1 in which the subsequently solidifiable fluid is adapted to remain pumpable at the borehole temperature for at least about one day before becoming substantially solid and impermeable.

6. The process of claim 1 in which the subsequently solidifiable fluid is a metal hydroxide-thickened aqueous fluid containing unreacted dissolved metal salt, suspended particles, and a pH-altering reactant in proportions such that the fluid is subsequently converted to a material that is substantially impermeable and solid.

7. The process of claim 1 in which the temperature of the portion of the borehole in which the casing is to be installed is at least about 150°F and the subsequently solidifiable fluid is an aqueous fluid containing dispersed clay and lime and dissolved caustic in proportions such that the fluid subsequently becomes a substantially rigid solid material.

8. The process of claim 1 in which the subsequently solidifiable fluid is an aqueous liquid containing suspended particles of material that is slowly solidified when contacted by a cement slurry in proportions such that any cement slurry-bypassed portions of the fluid are subsequently converted to material that is substantially impermeable and solid.

9. In a process in which a pipe section is installed within a portion of a borehole that was filled with drilling fluid during the drilling of the well and the space between the pipe section and the borehole wall is filled with fluid that is initially pumpable but is intended to later become solid and impermeable, the improvement which comprises:
   extending a relatively slender pipe string having an outer diameter significantly less than the borehole diameter into the borehole until it extends to at least near the bottom of the portion of the borehole in which the pipe section is to be installed;
   flowing fluid through the relatively slender pipe string to displace substantially all of the drilling fluid out of that portion of the borehole;
   filling that portion of the borehole substantially completely with a subsequently solidifiable fluid that has a density at least substantially equalling that of the displaced drilling fluid and has a chemical composition that adapts it to remain pumpable, while remaining at the borehole temperature until the pipe section has been installed, and then become substantially solid and impermeable;
   removing the relatively slender pipe string and installing the pipe section to be installed; and
   allowing the solidification of the subsequently solidifiable fluid in the annular space around the pipe section.

* * * * *